US012588606B2

(12) United States Patent
Martin et al.

(10) Patent No.: US 12,588,606 B2
(45) Date of Patent: Mar. 31, 2026

(54) AERIAL ELECTROSTATIC SYSTEM FOR WEATHER MODIFICATION

(71) Applicants: The United States of America, as represented by the Secretary of Agriculture, Washington, DC (US); Active Influence and Scientific Management, SP, San Angelo, TX (US)

(72) Inventors: Daniel E. Martin, College Station, TX (US); Arquimedes Ruiz-Columbie, San Angelo, TX (US)

(73) Assignees: The United States of America, as represented by the Secretary of Agriculture, Washington, DC (US); Active influence and Scientific Management SP, San Angelo, TX (US)

( * ) Notice: Subject to any disclaimer, the term of this patent is extended or adjusted under 35 U.S.C. 154(b) by 1176 days.

(21) Appl. No.: 17/387,348

(22) Filed: Jul. 28, 2021

(65) Prior Publication Data

US 2021/0352856 A1 Nov. 18, 2021

Related U.S. Application Data

(63) Continuation-in-part of application No. 16/377,276, filed on Apr. 8, 2019, now Pat. No. 11,116,150.

(60) Provisional application No. 62/695,259, filed on Jul. 9, 2018.

(51) Int. Cl.
| | | |
|---|---|---|
| *A01G 15/00* | (2006.01) | |
| *B05B 5/025* | (2006.01) | |
| *B64D 1/18* | (2006.01) | |
| *B64U 101/45* | (2023.01) | |

(52) U.S. Cl.
CPC ............ *A01G 15/00* (2013.01); *B05B 5/0255* (2013.01); *B64D 1/18* (2013.01); *B64U 2101/45* (2023.01); *B64U 2201/10* (2023.01); *B64U 2201/20* (2023.01)

(58) Field of Classification Search
CPC .......... A01G 15/00; B05B 5/00; B05B 5/025; B05B 5/0255; B64D 1/16; B64D 1/18
USPC .................... 239/2.1, 14.1, 171, 3, 690, 708
See application file for complete search history.

(56) References Cited

U.S. PATENT DOCUMENTS

| | | | | |
|---|---|---|---|---|
| 4,684,063 | A | 8/1987 | Goudy | |
| 5,975,425 | A | 11/1999 | Carlton | |
| 11,116,150 | B2 * | 9/2021 | Martin | ..................... B64D 1/18 |
| 2004/0134997 | A1 * | 7/2004 | Khain | .................... A01G 15/00 239/14.1 |
| 2005/0056705 | A1 | 3/2005 | Adulyadej | |
| 2017/0217587 | A1 * | 8/2017 | Goelet | .................. B64D 39/06 |
| 2024/0276927 | A1 * | 8/2024 | DeFelice | ................ A01G 15/00 |

* cited by examiner

*Primary Examiner* — Steven J Ganey
(74) *Attorney, Agent, or Firm* — John Fado; John Henri

(57) ABSTRACT

The system uses a specifically modified spray assembly to spray electrically charged fluid into selected clouds. In addition to rain enhancement, the system is also designed for snow enhancement, hail suppression, fog dissipation, and smog remediation.

19 Claims, 14 Drawing Sheets

Top Height of Max dBz

AERIAL ELECTROSTATIC SYSTEM FOR WEATHER MODIFICATION

REFERENCE TO RELATED APPLICATIONS

This current disclosure is a continuation-in-part (CIP) of co-pending U.S. Non-Provisional patent application Ser. No. 16/377,276. Both the current disclosure and U.S. Non-Provisional patent application Ser. No. 16/377,276 claim priority to U.S. Provisional Application No. 62/695,259, filed Jul. 9, 2018. Both U.S. Provisional Application No. 62/695,259, and co-pending U.S. Non-Provisional patent application Ser. No. 16/377,276, are hereby incorporated by reference in their entirety.

FIELD OF THE INVENTION

The disclosed method and system relates to electrostatically charged aerial applications for the purpose of weather modification. Specifically, the system and method described herein relates to "seeding" clouds.

BACKGROUND OF THE INVENTION

Currently, cloud seeding for rain enhancement is done by launching glaciogenic (silver iodine) and hygroscopic (calcium chloride) flares into clouds that fit a specific profile and have a specific set of characteristics so that the clouds are considered to be good candidates for seeding. The flares enhance the colloidal instability within the clouds and thereby increase the likelihood of precipitation. To deploy the flares, a pilot looks for and flies under (preferably) cumuliform clouds with a flat base that are positioned between 1,000 and 15,000 feet above ground level. An updraft of at least 200 ft/min must be present to deploy the flares.

While the currently available flares are somewhat effective, they are relatively expensive, and a strong updraft must be present to make the best use of the flares. The need exists for a cheaper, more versatile, and preferably more effective means of seeding clouds. In lieu of flares, the method described herein (preferably) uses ordinary electrically charged tap water sprayed from a specifically selected spray system to seed targeted clouds. The inventor's proposed system and method is more effective, flexible, efficient, and cheaper than currently used flare-based technology. In addition to rain enhancement, the inventors' system and method is also designed for snow enhancement, hail suppression, fog dissipation, and smog remediation.

SUMMARY OF THE INVENTION

This disclosure is directed to a method of "seeding" clouds for weather modification. In accordance with the method, an aircraft is equipped with a spraying system that includes at least one sprayer. The sprayer's spray nozzle produces an atomized spray. The spray nozzle is surrounded by a positively charged electrode designed to impart a negative charge to fluid spraying from the sprayer. In operation, an aircraft equipped with the spraying system takes off and locates a targeted cloud. The negatively charged pressurized fluid is sprayed out of the spray nozzles so that the electrically charged spray enters the targeted cloud and thereby seeds the cloud.

DETAILED DESCRIPTION OF PREFERRED EMBODIMENTS

Figure 1:
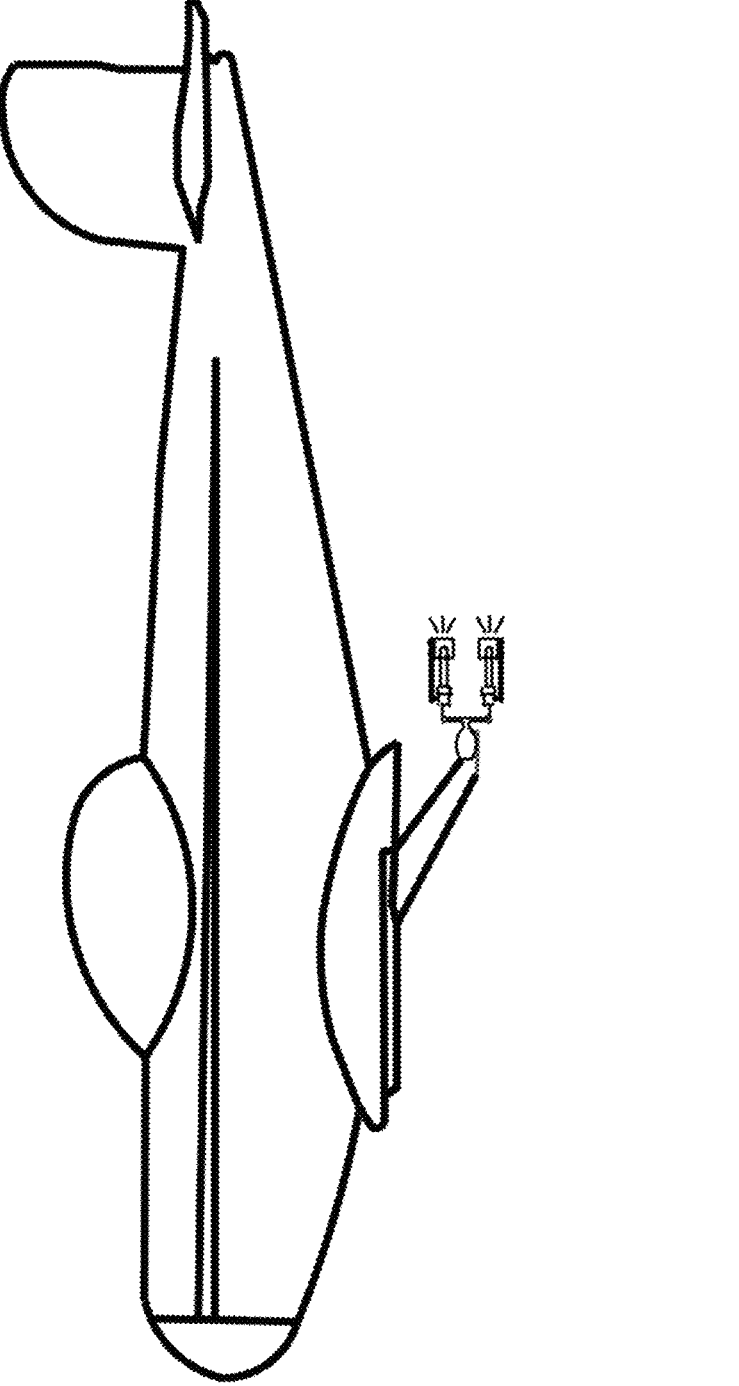
FIG. 1 is a schematic of the spray assembly of the preferred embodiment installed on an aircraft.

This disclosure is directed to a system and a method to "seed" clouds with electrically charged fluid. For the purposes of this disclosure, "cloud seeding" may be generally defined as spraying an electrically charged fluid from an aircraft so that the electrically charged fluid enters a targeted cloud. In the preferred embodiment, the system and method are designed for rain enhancement. "Rain enhancement" is defined as rain production that results from a cloud seeding/treatment process. As shown in FIG. 1, the method includes equipping an aircraft with a system of sprayers and nozzles to seed the clouds. The spray system used in the disclosed process is a modified version of the spray apparatus originally disclosed in U.S. Pat. No. 5,975,425 to Carlton, which is incorporated herein by reference.

Figure 2:
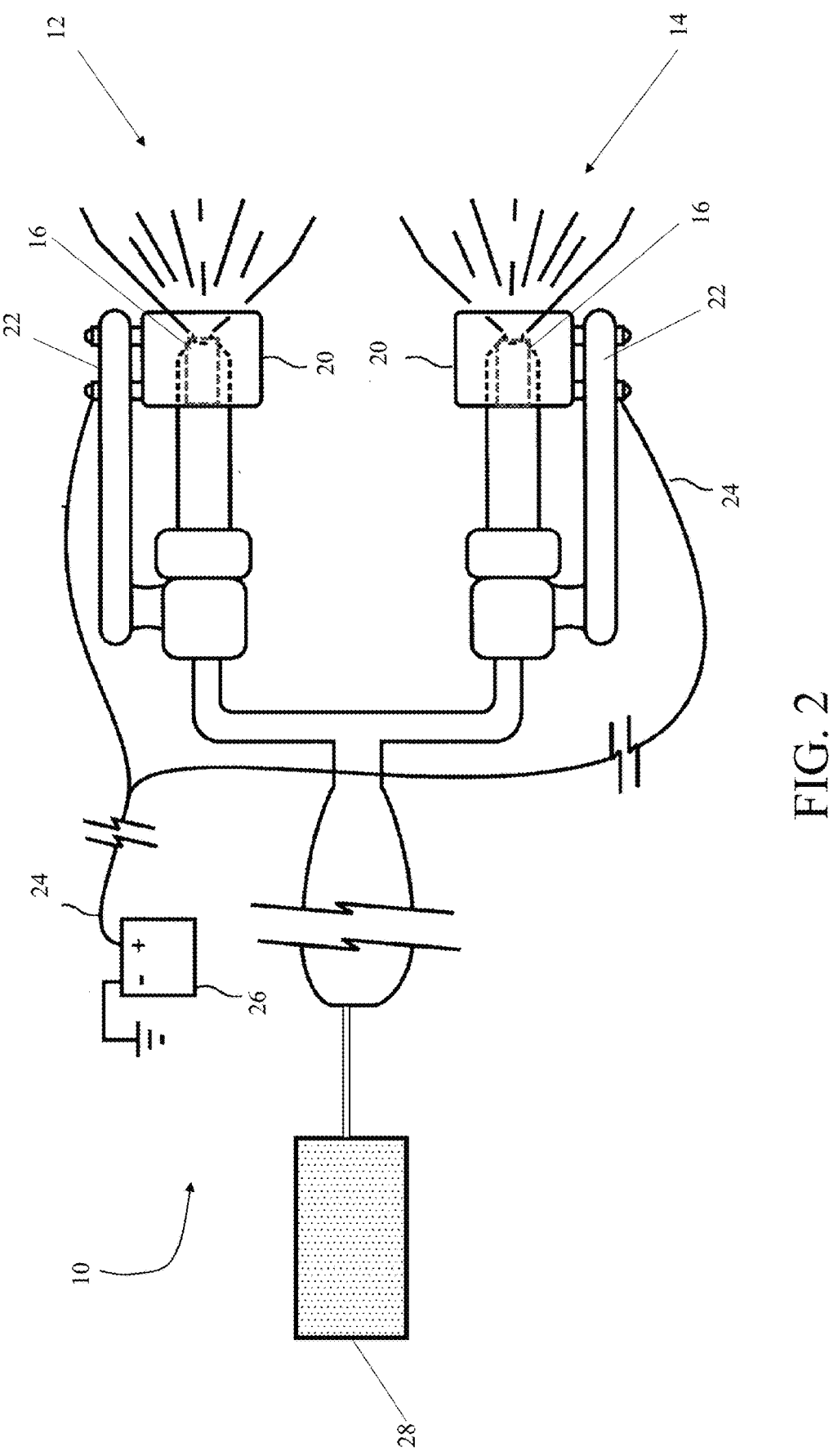
FIG. 2 is a schematic of the spray assembly.

As shown in FIG. 2, the current spray system 10 comprises at least two sprayers 12, 14. The inventors modified the Carlton sprayers by using nozzles 16 designed to generate a volumetric median diameter (VMD) spray of between 50-300 μm. These types of nozzles 16 are known as "TX-VK" hollow-cone nozzles and they are manufactured by a variety of companies. This type of nozzle 16 produces a finely atomized spray pattern and provides thorough coverage for a spray area. The typical spray angle is 60° to 90° (preferably 80°) at 100 psi.

As shown in FIG. 2, the spray nozzles 16 are surrounded by electrodes 20. The electrodes 20 are attached to a charging system 26 through a structural member 22 and an associated electrical conductor 24. The charging system 26 charges all of the electrodes 20 with the same electrical polarity (preferably positive). By positively charging the electrodes 20, a negative charge is imparted to the water droplets when the droplets are sprayed from the nozzles 16. Significantly, the inventors have modified the Carlton apparatus so that the trailing edge of the electrode 20 is preferably 4.9 mm (0.0-10.0 mm) from the nozzle 16 orifice. While the preferred embodiment uses an inductive charging process, in alternative embodiments the spray fluid may be directly charged.

In operation, as shown in FIGS. 1 and 2, a spray nozzle system 10 is structurally connected to an aircraft capable of performing spray operations. The aircraft is configured to carry a hopper/tank 28 capable of holding a substantial volume of tap water. The tank 28 supplies water to the nozzles 16—thereby enabling a user to perform cloud seeding operations.

Although tap water is used in the preferred embodiment, other chargeable fluids and water-based liquids should be considered within the scope of the invention. For example, the spray operations could be conducted with any water-based solution, including purified water, salt water, or water-based fluids that include dissolved chemicals or metals that may affect/enhance the physical or electrical characteristics and performance of the fluid as it is sprayed from the aircraft.

Figure 3:
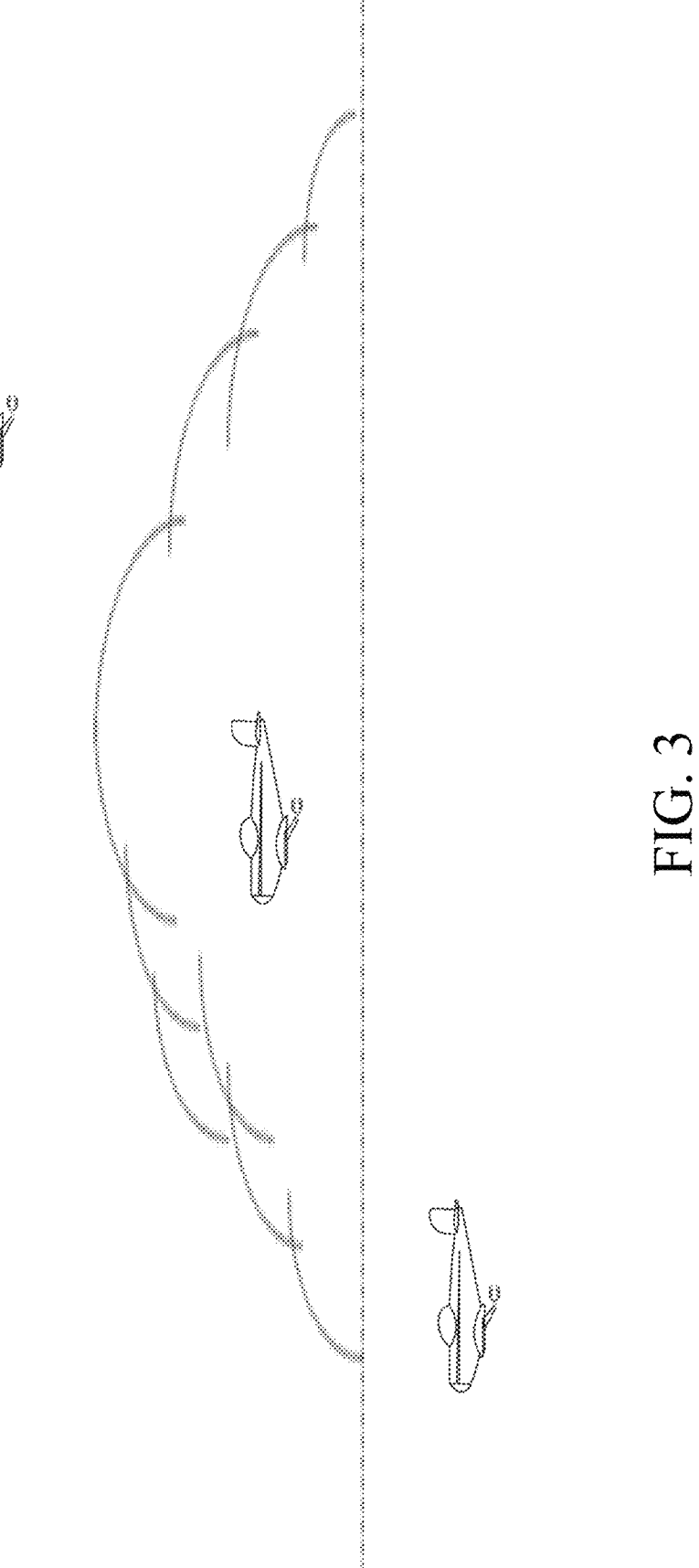
FIG. 3 shows an exemplary schematic of multiple aircraft flying in multiple positions relative to a targeted cloud—including above, in the interior of, and below the targeted cloud. In the rain enhancement, hail suppression, fog dissipation, and smog remediation embodiments, single or multiple aircraft (equipped as described infra) may fly in any one of (or all of) the positions shown in FIG. 3—to the extent that one skilled in the art determines that the mission can be safely accomplished. A single aircraft flying solo, or alternatively, multiple aircraft flying in each position, should be considered within the scope of the claims. With regard to the relative timing of the seeding operation, the time that the aircraft is/are seeding the targeted cloud may be staggered, or all aircraft may seed the cloud simultaneously. All possible combinations of aircraft and flight profiles should be considered within the scope of the invention.

As generally shown in FIG. 3, in the rain enhancement embodiment, once the aircraft is properly configured, the aircraft takes off and looks for cumulus and cumulonimbus clouds that conform to a specific profile and have a specific set of characteristics so that the clouds are considered to be good candidates for seeding. Specifically, in the rain enhancement embodiment, the aircraft pilot looks for a seedable cloud with a well-defined flat base. The cloud may be at an altitude between 1,000 and 15,000 feet above ground level (AGL). FIG. 3 shows the general operating environment and the preferred conditions for carrying out the rain enhancement method. Although a piloted aircraft is used in the preferred embodiment, an unmanned air vehicle (UAV) may also be used. In the case of a UAV, the "pilot" flies the aircraft remotely from a position on the ground (or in a "chase" aircraft) and relays instructions to the aircraft through a communications link (such as an electronic telemetry transmission). In further alternative embodiments, unless there is an emergency situation, the UAV may be completely autonomous so that all functions are automatically performed without the input of a human operator—so that the "pilot" comprises primarily a computer processor and associated support equipment onboard the UAV.

Once an acceptable cloud is located, the pilot flies under the base of the cloud as close as possible while maintaining VFR flight conditions. When the updraft below a cloud exceeds 100 ft/min., the pilot turns the spray system 10 "on", and sets the liquid/water pressure flowing from the tank 28 to 50-100 psi, which yields a system flowrate to the spray system 10 of 5.0-10.0 gallons per minute. Simultaneously, the charging system 28 imparts a 2 mA electrical current (at +5.0-15.0 kV) to the liquid sprayed from the spray system 10 nozzles 16. When the updraft dissipates, the pilot shuts off the spray system 10 and searches for another cloud. This process is repeated until the pilot runs out of either fuel or water/liquid.

As noted supra, in alternative applications/embodiments, the process and system described herein may also be used to suppress hail, dissipate fog, or remediate smog. The system and process may also be used for snow enhancement (snowpack augmentation). In those embodiments, the aircraft may fly above the clouds and spray (or otherwise deploy) a liquid/water so that the liquid drops down into the target clouds.

Electrostatic (ES) Seeding for Rain Enhancement (Field Test Results)

In the summer of 2017, the inventors and an associated technical support team gathered data in the west Texas area by seeding 16 clouds using the methods described in this disclosure. The data generated by the inventors' system was compared to data gathered by seeding 51 clouds using (conventional) dual seeding systems under comparable conditions. FIGS. 4-14 graphically show the results of the inventors' methods as compared to the conventional methods, and with the results of natural processes with no human intervention (i.e. the "control" or "do nothing" option).

Figure 4:
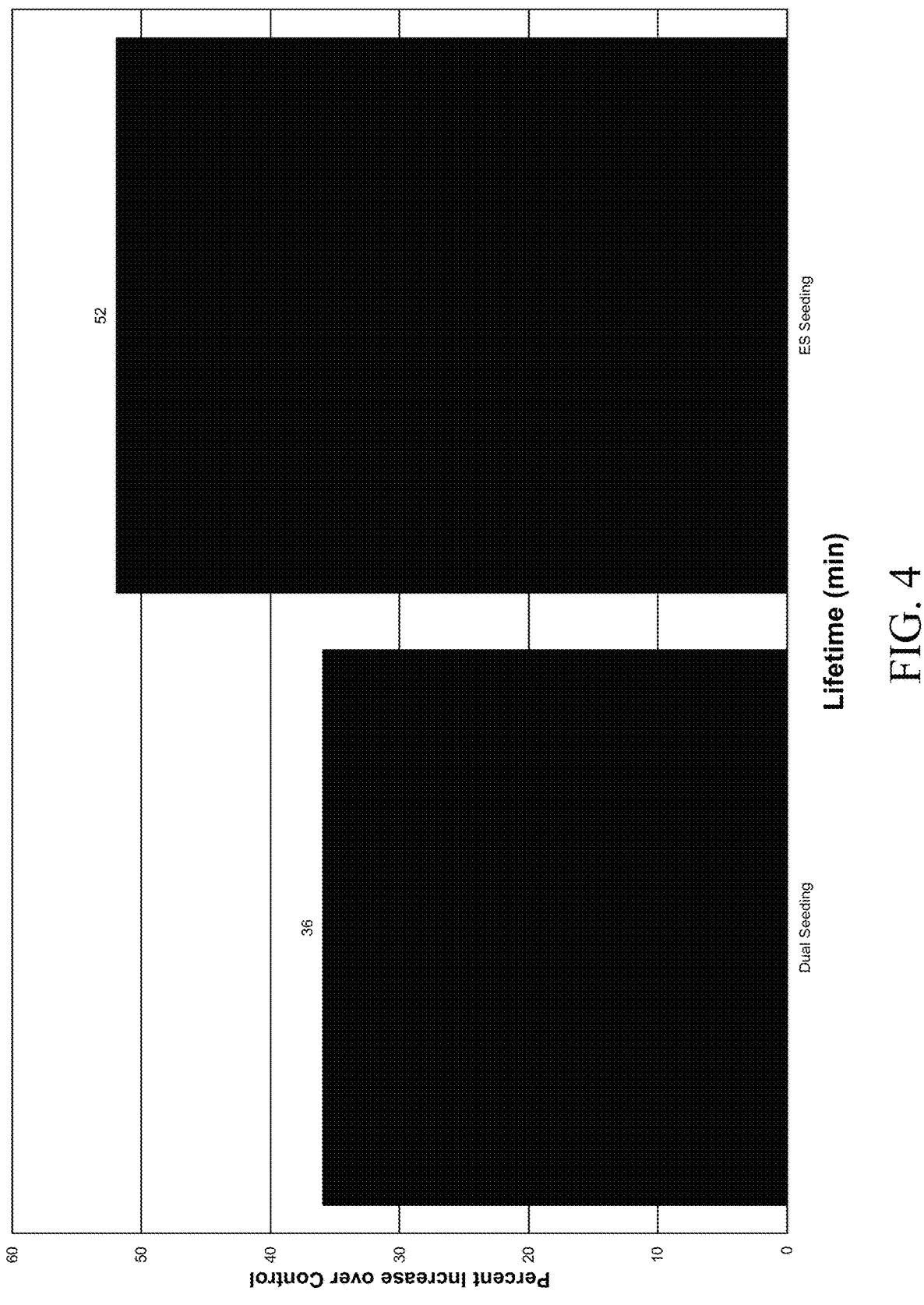
FIG. 4 shows the increase in lifetime of the storms due to electrostatic (ES) seeding for rain enhancement. The duration of the storm can be extended by a more efficient warm rain process and/or the creation of ice within a storm. Latent heating will allow the storm to grow vertically adding to its lifetime. A longer lasting storm will produce more water over a larger area of land.
Figure 5:
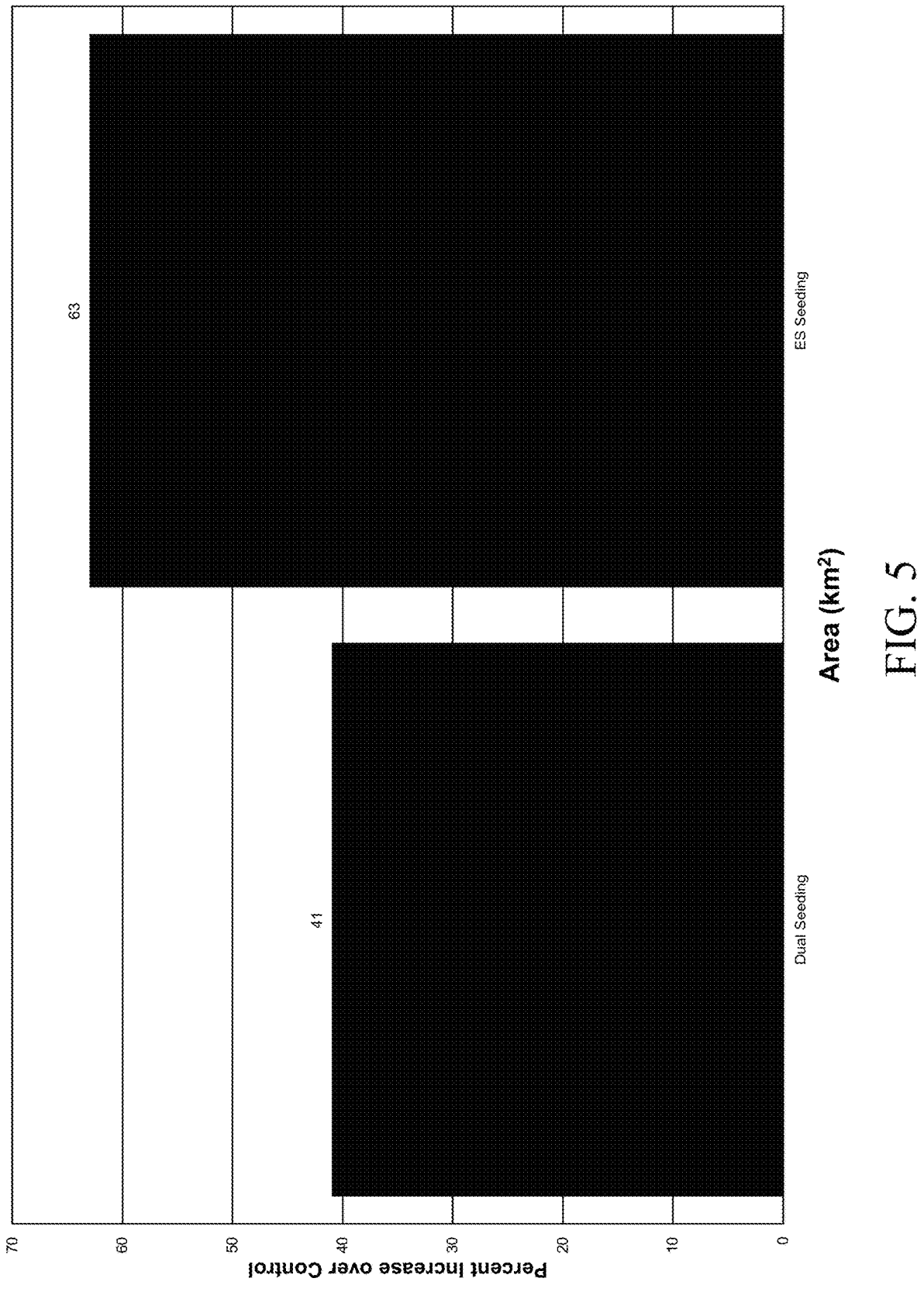
FIG. 5 shows the increase in area of the storms due to ES seeding for rain enhancement. This is the 2-dimensional size of the storm. The more land the storm covers, the larger the impact. Increasing the area of a storm increases the number of individuals to be impacted by the benefits of cloud seeding.
Figure 6:
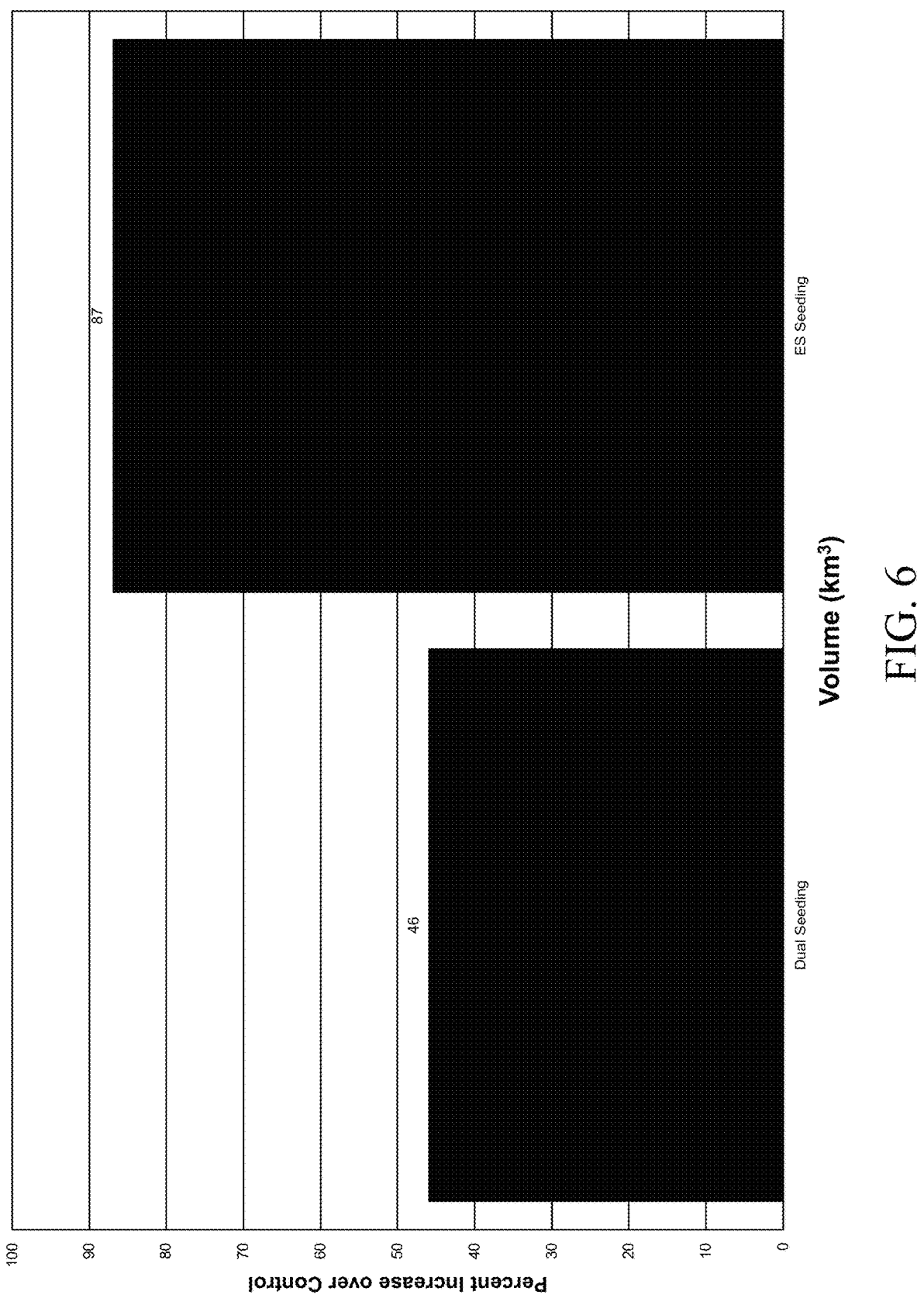
FIG. 6 shows the increase in Volume of the storms due to ES seeding for rain enhancement. This is the 3-dimensional size of the storm. This measurement includes area but also includes cloud depth. The larger and deeper the storm, the greater the likelihood of it holding more water.
Figure 7:
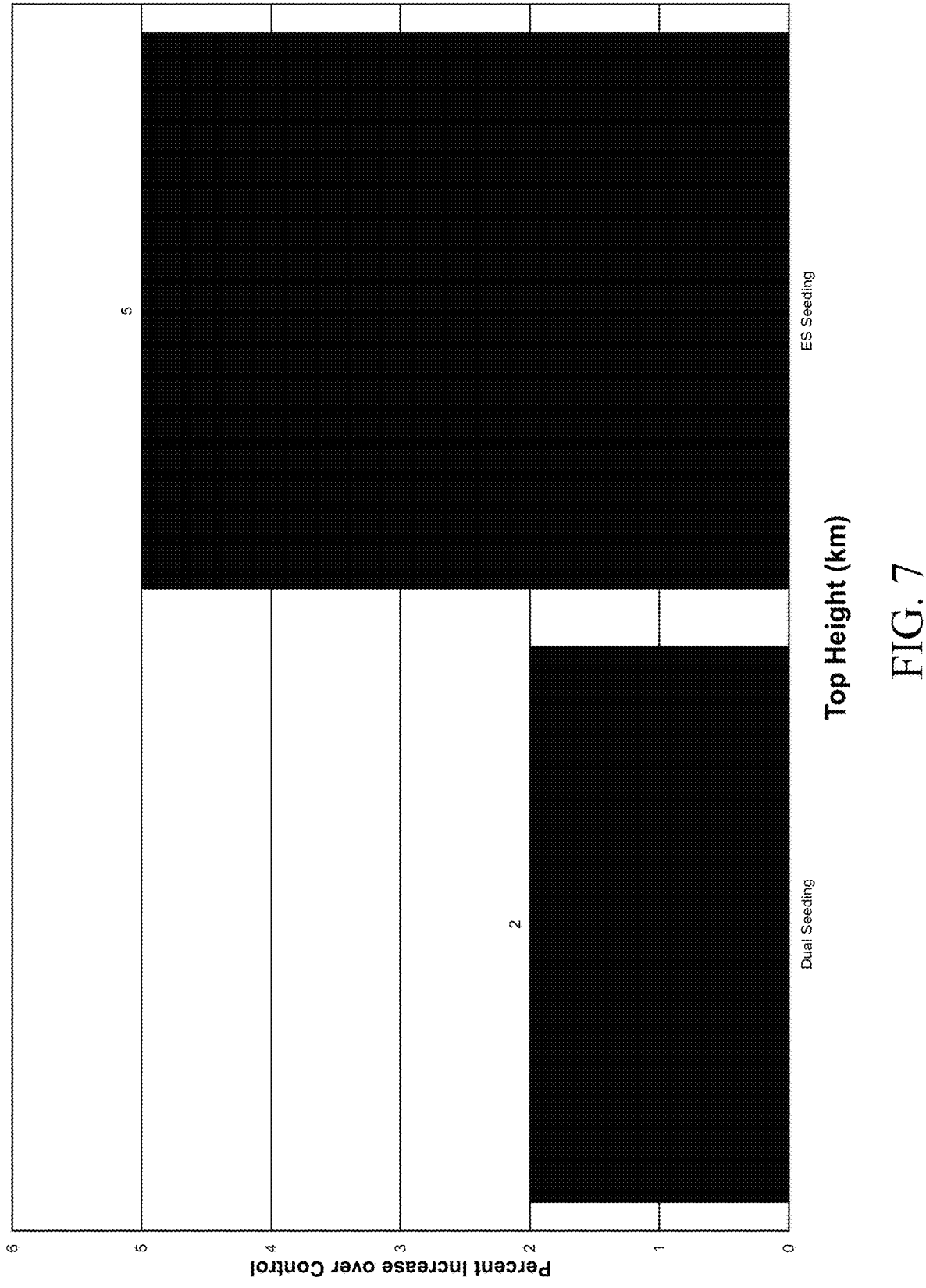
FIG. 7 shows the increase in Top Height of the storms due to ES seeding for rain enhancement. This is the highest portion of the storm, which allows one to know the vertical growth. Clouds that grow more vertical will produce more rainfall due to the volume of the cloud. Additionally, having a high top-height indicates that the ice nucleation process is taking place hinting at the release of latent heat.

As briefly described above, FIGS. 4-7 show significant increases in the duration and size of clouds/weather events associated with ES seeding. Specifically, FIG. 4 shows increases in lifetime (i.e. duration as measured in minutes); FIG. 5 showed an increase in two-dimensional horizontal area (as measured in km²); FIG. 6 showed an increase in three-dimensional volume (measured in km³); and, FIG. 7 showed an increase in the vertical height of ES seeded clouds measured in km).

Figure 8:
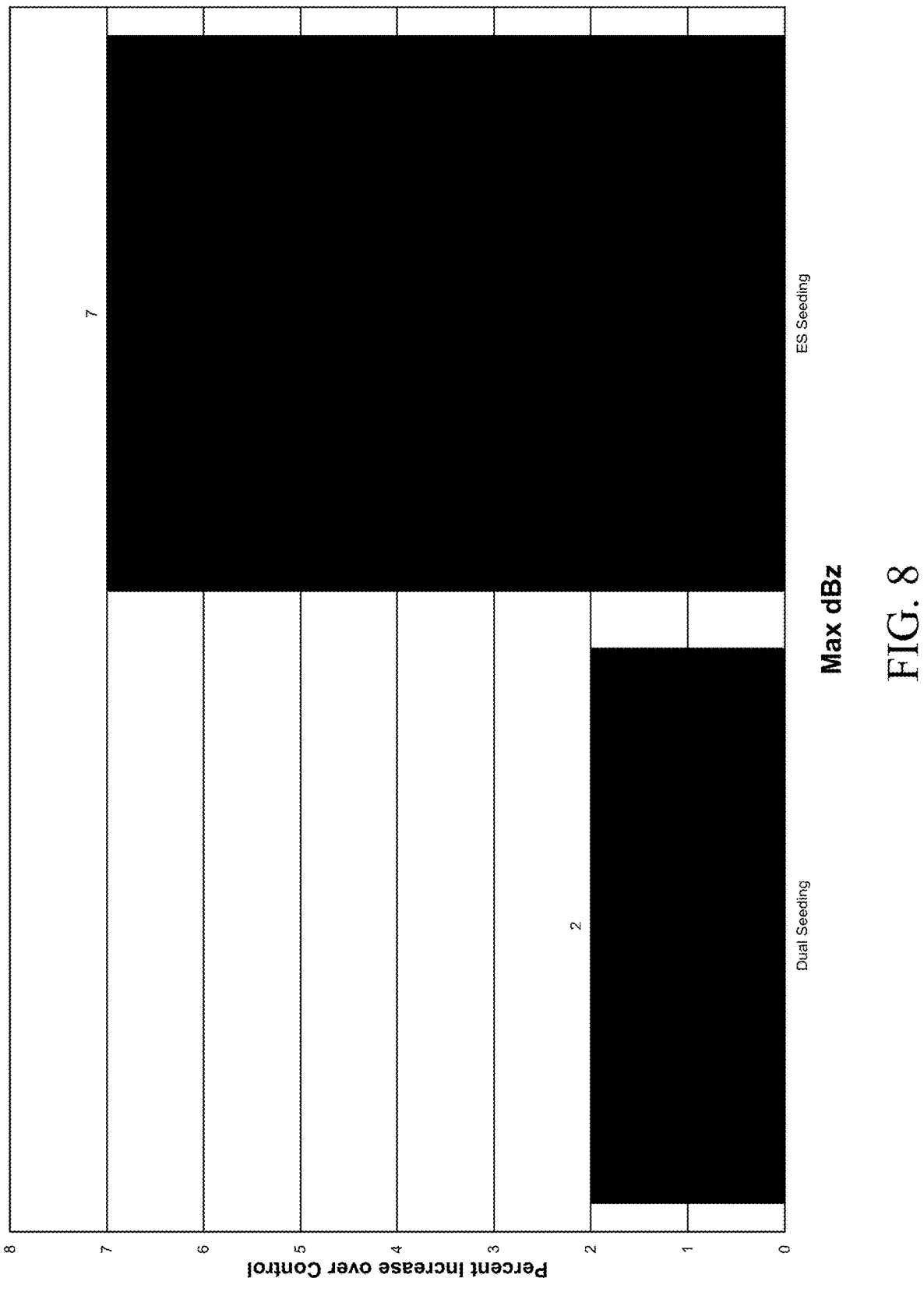
FIG. 8 shows the increase in Max dBz of the storms due to ES seeding for rain enhancement. The term "Max dBz" is generally defined as the reflectivity produced by radar. Higher dBz's can indicate either) hail or a very high concentration of cloud droplets. By increasing Max dBz, it can show how efficient a cloud is working. These data generated are compared to hail reports to ensure cloud seeding is suppressing the hail, which has been documented in research and conducted operationally in several countries.
Figure 9:
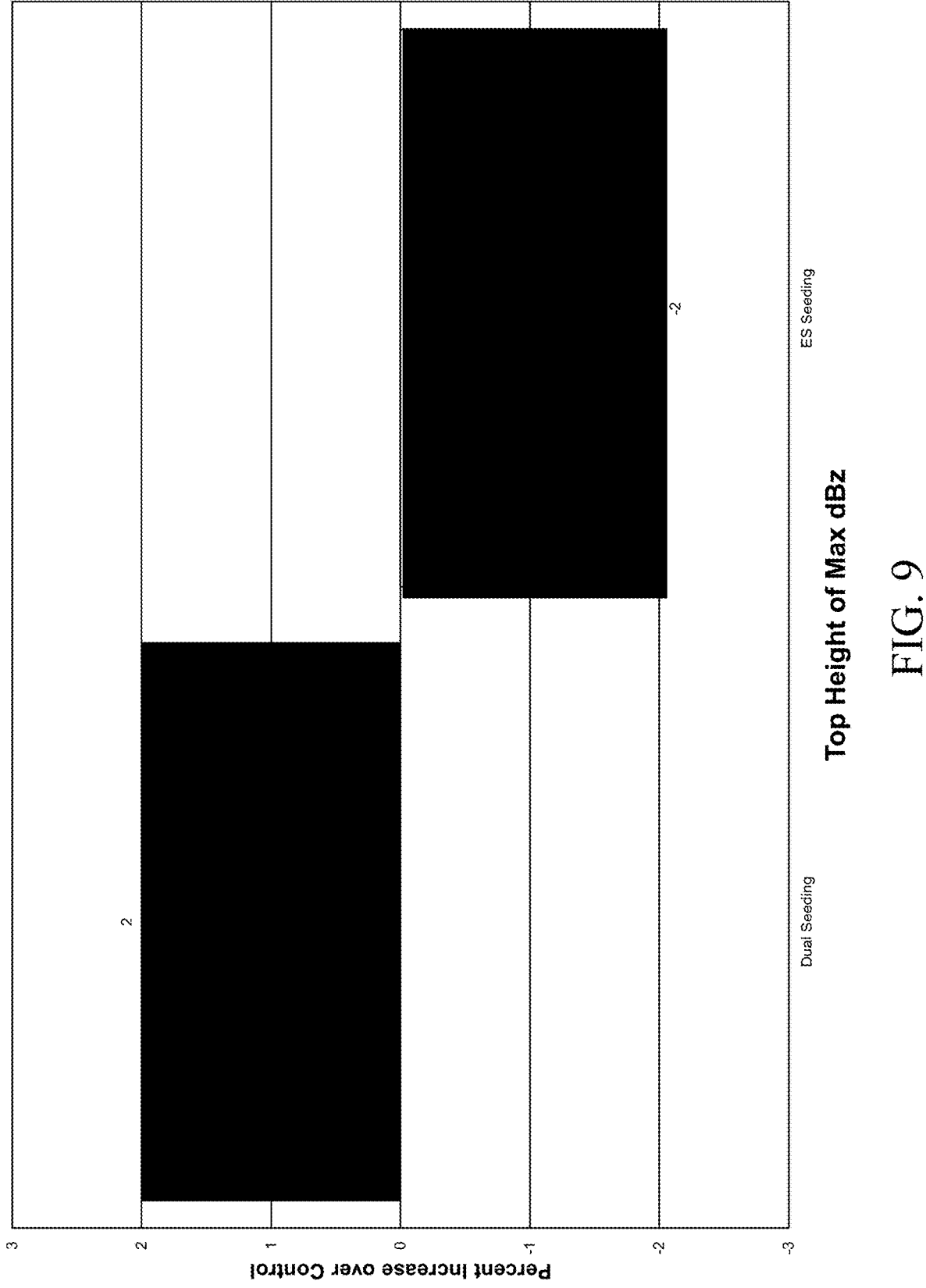
FIG. 9 shows the decrease in Top Height of Max dBz of the storms due to ES seeding for rain enhancement. If the Top Height of Max dBz is higher, this is a good indication of hail. Hail is not desirable. However, when the Top Height of Max dBz is lower, the bulk of larger droplets and/or ice are lower in the cloud, thus having a higher likelihood of precipitation as rain instead of hail.
Figure 10:
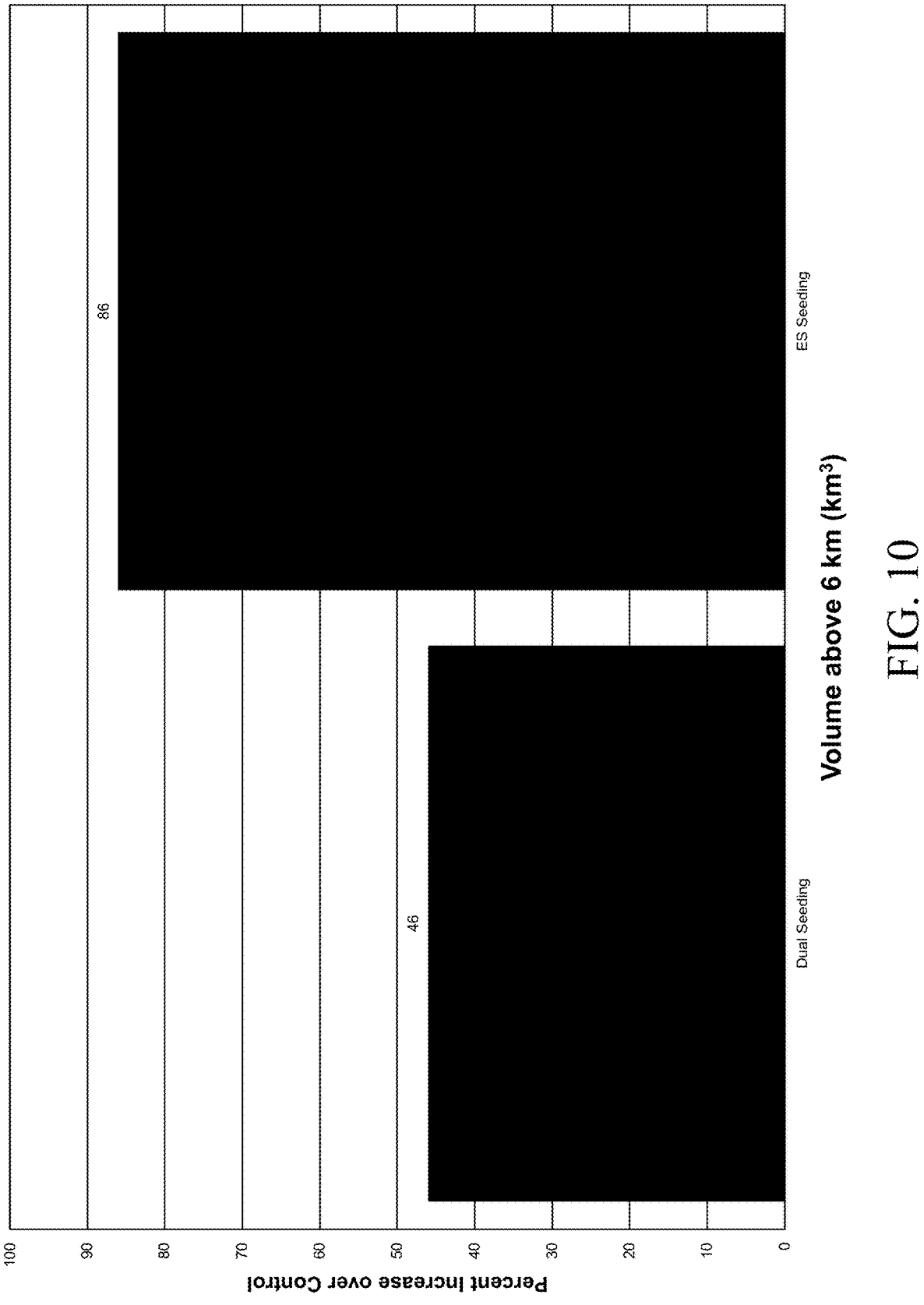
FIG. 10 shows the increase in Volume Above 6 km of the storms due to ES seeding for rain enhancement. This is the amount of cloud likely to be below freezing. With a larger, deeper cloud extending beyond the freezing level, the ice nucleation process is more efficient.
Figure 11:
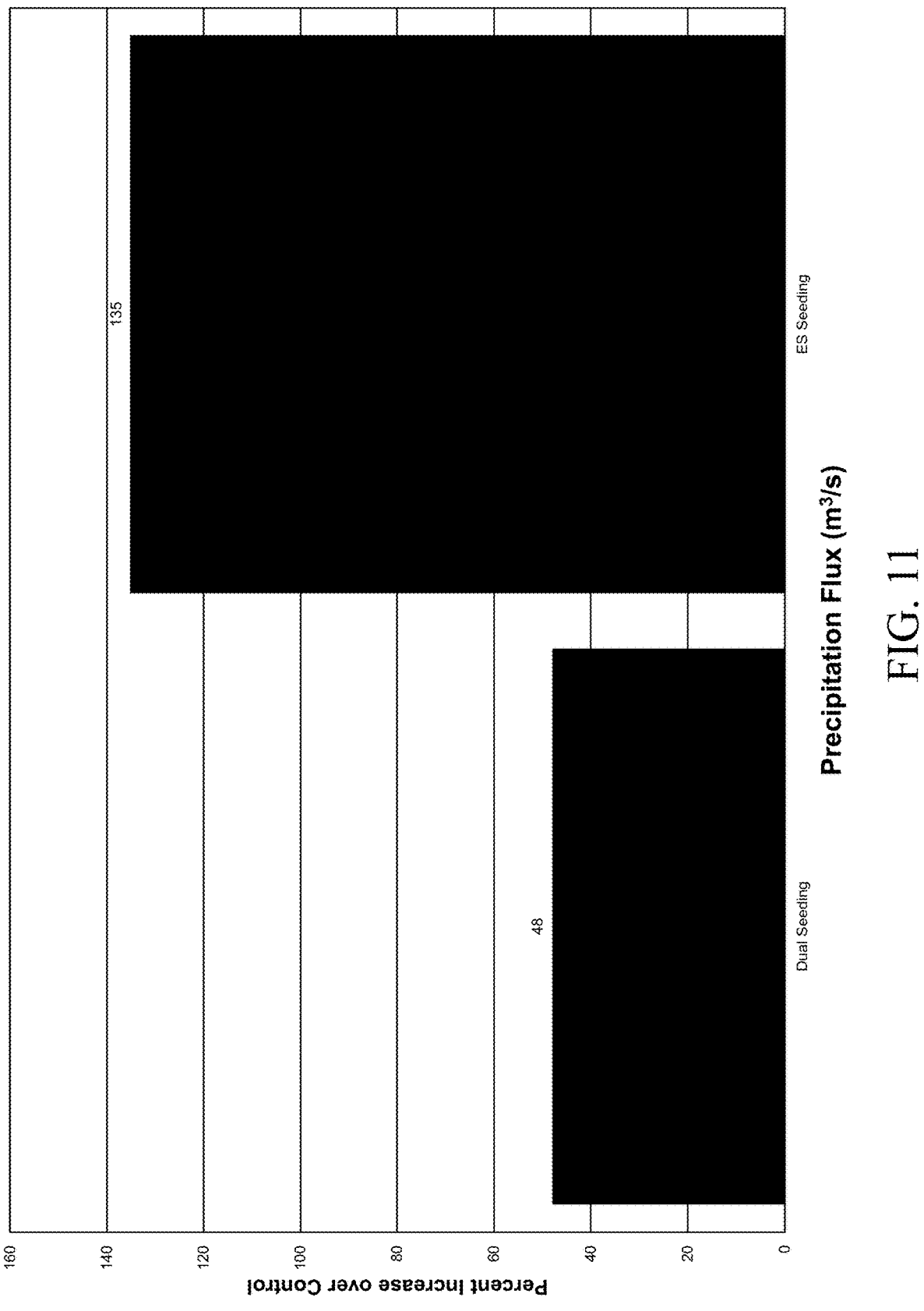
FIG. 11 shows the increase in Precipitation Flux of the storms due to ES seeding for rain enhancement. Precipitation Flux is a parameter that includes a boxed area over a given time. Therefore, higher precipitation flux is a parameter which shows the intensity of the precipitating storm. In cloud seeding, the goal is to enhance rainfall, and this parameter is the primary indicator of this objective.
Figure 12:
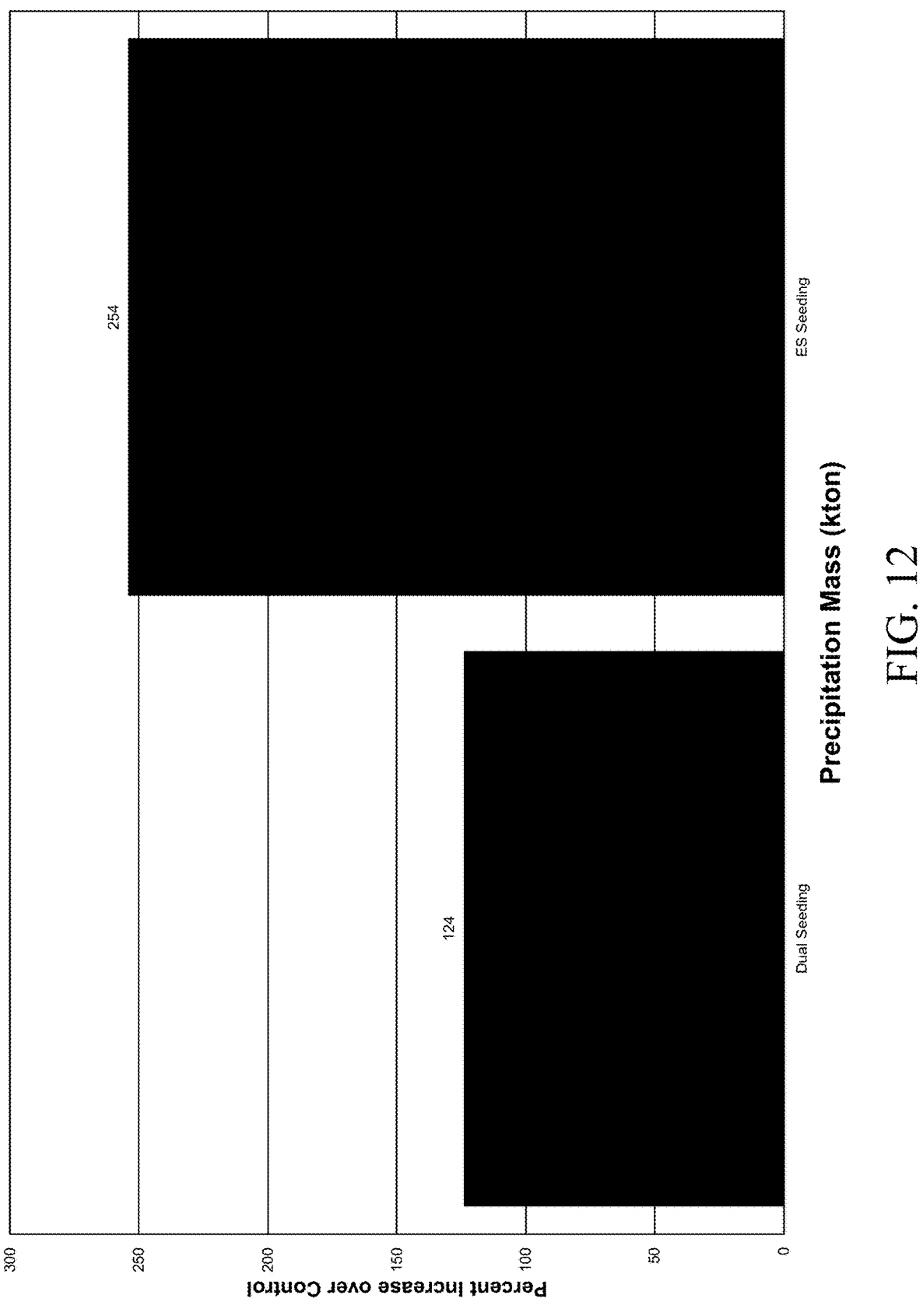
FIG. 12 shows the increase in Precipitation Mass of the storms due to ES seeding for rain enhancement. Precipitation Mass is the mass of rainfall coming out of the cloud. Similar to precipitation flux, this is a parameter that shows how much precipitation is falling out of seeded clouds versus unseeded clouds.
Figure 13:
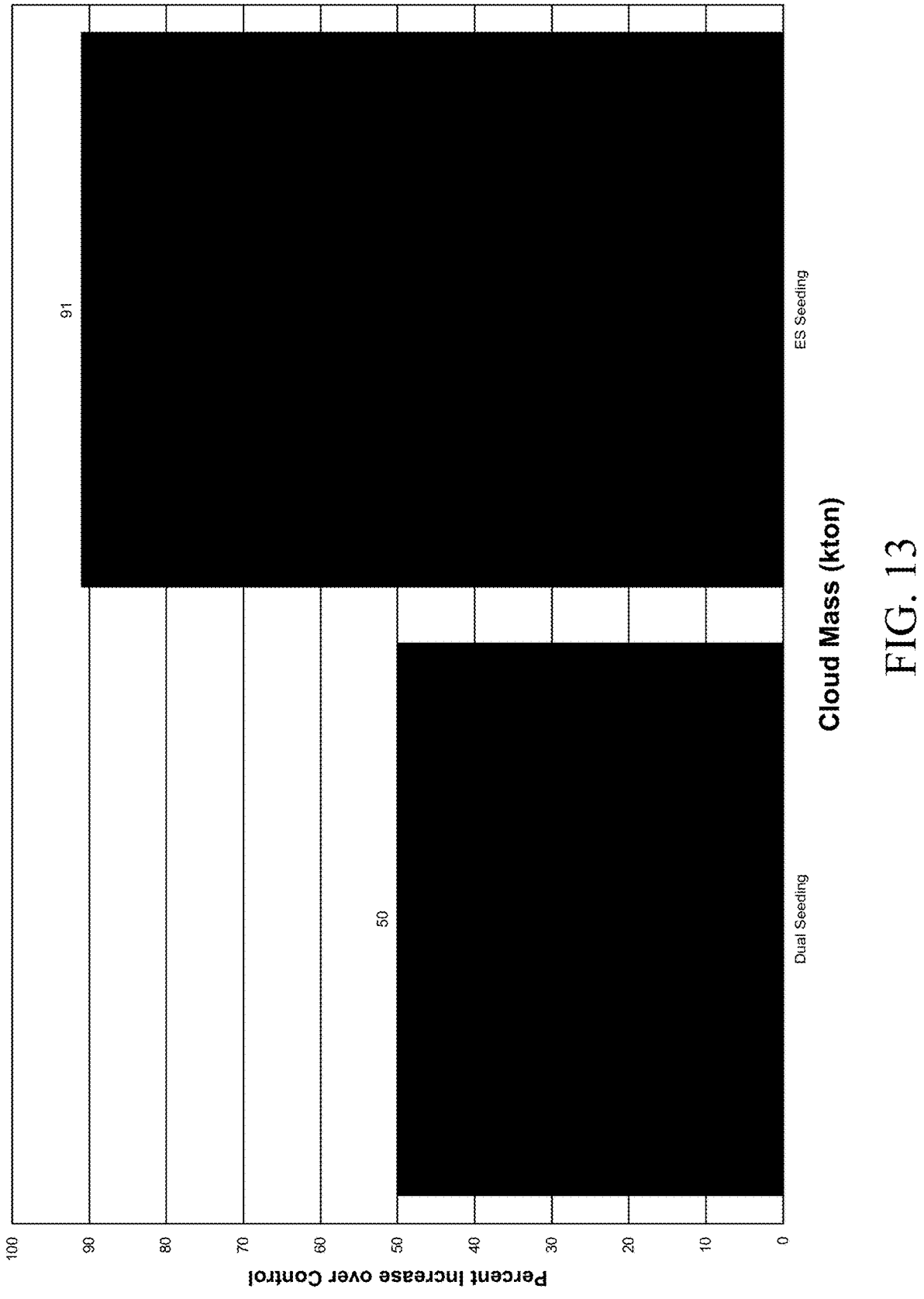
FIG. 13 shows the increase in Cloud Mass of the storms due to ES seeding for rain enhancement. The Cloud Mass is similar to precipitation mass, however not all of the moisture falls out of the cloud. This provides insight into how much moisture is in the cloud. When compared to precipitation mass, efficiency can be calculated.
Figure 14:
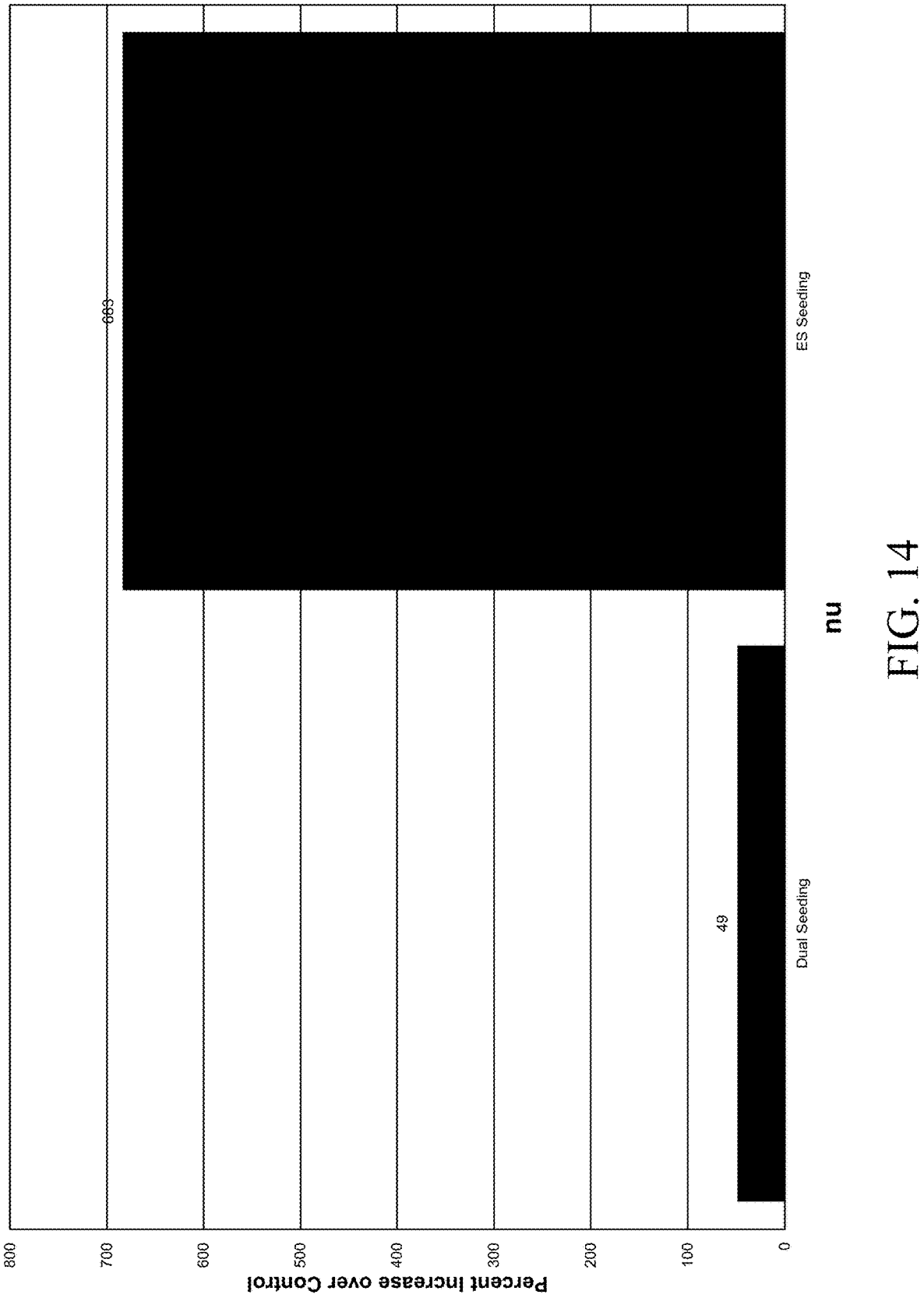
FIG. 14 shows the increase in "Nu" of the storms due to ES seeding for rain enhancement. In the weather modification art, the term "Nu" describes the efficiency of the cloud, which is a comparison of precipitation mass to cloud mass.

FIGS. 8-14 show characteristics that are frequently associated with rain and/or hail. FIGS. 8-9 compare Max dBz characteristics with both control and dual seeding alternatives. FIG. 10 compares volume of a cloud (in km³) above 6 km—which is a characteristic frequently associated with hail. FIG. 11 (directed to Precipitation Flux), FIG. 12 (Precipitation Mass), FIG. 13 (Cloud Mass), and FIG. 14 (Nu) are all measures of storm density and intensity. All these characteristics show significant improvement as a result of ES seeding.

In summary, the data gathered during the field tests confirm the benefits of ES cloud seeding. Significantly, FIGS. 8, 11, 12 and 14, showed an estimated 200 to 300 percent increase in the likelihood of rainfall, and an increase in storm intensity (Max dBz) and cloud efficiency (nu) relative to conventional cloud seeding methods. The data also show that "Precipitation Flux"—which is a measure of the intensity of rainfall associated with a seeded cloud— more than doubled.

ES Seeding—Rain Enhancement Alternative Embodiments

As noted supra, in alternative embodiments, single or multiple aircraft (equipped as described supra) may fly in any one of (or all of) the positions shown in FIG. 3—to the extent that one or ordinary skill determines that the mission can be safely accomplished. A single aircraft flying solo, or alternatively, multiple aircraft flying in each position, should be considered within the scope of the claims. With regard to the relative timing of the flight(s) during cloud seeding operations, the aircraft may be staggered, or all aircraft may operate simultaneously. All combinations of aircraft and flight profiles should be considered within the scope of the invention.

ES Seeding for Snow Enhancement

One of ordinary skill in the cloudseeding art defines "snow enhancement" as snow production that results from a cloud seeding/treatment process. The term "snow enhancement" may be used interchangeably with the term "snowpack augmentation". In the snow enhancement process, aircraft (configured as described supra for rain enhancement) may fly either above, below, or through a targeted cloud. When the aircraft flies above the targeted cloud, electrostatically charged spray descends downwardly from the aircraft sprayers and into the cloud.

As described supra, the spray nozzles 16 generate a volumetric median diameter (VMD) spray in the range of 50-300 μm. During the snow enhancement process, when the aircraft flies above the cloud, a VMD at the larger end of the spray range is preferred so that the charged spray descends downwardly into the targeted cloud. When the aircraft flies below a targeted cloud, a VMD at the smaller end of the spray range is preferred so that the charged spray is carried up into the cloud by the updraft. When an aircraft flies through a cloud, the preferred VMD may be anywhere within the specified range.

In operation, an aircraft takes off and looks for a cloud formation with precipitation potential—like the cumulus and cumulonimbus clouds targeted for rain enhancement. As described supra with the regard to rain enhancement, the positively charged electrodes 20, impart a negative charge to the water droplets when the droplets are sprayed from the nozzles. As the droplets descend (or rise) into the targeted cloud, the droplets increase the colloidal instability within the clouds and thereby enhance the likelihood of precipitation in the form of snow.

Because snow enhancement operations usually occur in a low temperature environment, it may be necessary to mix the water in the spray tank 28 with additives that depress the freezing point of the water. The freezing temperature depressant additives prevent the water from freezing during snow enhancement operations. Examples of water freezing temperature depressant additives include but are not limited to ethanol, glycol, ethylene glycol, sodium chloride, magnesium chloride and other salts, etc. Essentially, any water temperature freezing depressant additive capable of mixing with water and functioning as described should be considered within the scope of the invention.

ES Seeding for Hail Suppression

One of ordinary skill in the cloud seeding art defines "hail suppression" as an interruption in the hail formation process within a cloud as a result of seeding/treatment of the cloud. As a result of hail suppression, a targeted cloud produces primarily rain with little or no hail—and any hail produced is small or of minimal size relative to large damaging hail that may occur in the absence of a hail suppression process. In the hail suppression process, radar or personal observation may be used to identify clouds that are deemed to possess a high probability to produce damaging hail. Although hail suppression can be done either above or below a targeted cloud, it is generally preferable to operate below the clouds because (among other things) the lower temperatures at higher altitudes can be uncomfortable and may require the use of freezing temperature depressant additives—which may complicate the mission. In the hail suppressant configuration, the spray nozzles 16 generate a VMD spray in the range of 50-300 μm. When the aircraft flies below a targeted cloud, the VMD is preferably smaller so that the charged spray is carried up into the cloud by the updraft. When the aircraft flies above the cloud, the VMD is preferably larger so that the charged spray falls down into the targeted cloud.

When flying below the cloud, the hail suppression process is essentially the same as the process that is used to enhance rainfall, but a more aggressive approach may be taken. In a hail suppression operation, time is of the essence because the potential hailstorm environment usually evolves rapidly. An aircraft (configured as described supra for rain enhancement) moves more quickly under the storms, making sure not to miss any inflow opportunities to seed the cloud. In a hailstorm scenario the whole cloud is seeded rather than just selected individual pockets of inflow or updraft. In addition, the clouds are seeded earlier—as soon as the potential for damaging hail is identified. As the droplets ascend (or descend) into the targeted cloud, the droplets enhance the colloidal instability within the clouds and thereby increase the likelihood that a strong downdraft will develop within the cloud. Ideally, the strong downdraft will result in rain, rather than the type of vertical circulation within the cloud that often results in damaging hail.

Although it is possible that aircraft could fly through a targeted cloud during a hail suppression mission, it should be done with extreme caution due to the turbulent environment within an actual or potential hail-producing cloud. One of skilled in the art should make a prudent determination regarding the safety of the mission. To the extent that a decision is made to fly the mission, a UAV would be more suited for this type of flight.

ES Seeding for Fog Dissipation and/or Smog Remediation

One of ordinary skill in the cloud seeding art defines "fog dissipation" as fog dispersal or clearing that results from cloud seeding/treatment. In the cloud seeding arts, a "fog bank" is defined as comprising a type of low-level cloud. Specifically, in the cloud seeding arts, a "fog bank" is defined as a type of cloud at or below 500 feet AGL. In the preferred operating mode, aircraft fly above a fog bank to perform a fog dissipation mission. Missions flying through or even below a fog bank may be rare and one skilled in the art should make a prudent determination regarding the safety of those types of missions.

One of ordinary skill in the cloud seeding arts defines "smog remediation" as smog dispersal or clearing that results from cloud seeding/treatment. As with fog, in the cloud seeding arts, a "smog layer" is defined as comprising a type of low-level cloud. Specifically, in the cloud seeding arts, a "smog layer" is defined as a cloud at or below 1,000 feet AGL. Smog is defined as fog or haze in combination with atmospheric pollutant particulates that may be in the form of smoke, vehicle emissions, or particulates released into the air as a byproduct of various industrial operations. Smog remediation missions are preferably performed as the aircraft flies above the smog layer, however smog remediation may also be performed by flying through or below the smog layer—pending a safety evaluation by one skilled in the art.

In the case of fog or smog, ground and/or aerial observers or instrumentation locate a low-level cloud (i.e. a fog bank or smog layer) that is a target for dissipation/remediation. In the fog dissipation/smog remediation process, an aircraft (configured as described supra for rain enhancement) preferably flies above the targeted (low-level) cloud. Although the aircraft spray nozzles may spray droplets having a VMD in the range of 50-300 μm, the best results occur when the VMD is between 150-250 μm. With regard to fog dissipation, as the charged droplets descend into the fog, the droplets collide with and attract the moisture droplets that comprise the fog bank/layer so that the continuously enlarging droplets are carried downwardly and the fog is dissipated.

With regard to smog remediation, the moisture that typically comprises fog may be combined with pollution particulates that are also suspended in the air. As charged droplets that are sprayed from the aircraft sprayers descend, the droplets collide with and attract—not only moisture droplets—but also suspended particulates that comprise the polluting materials. Similar to fog dissipation, the charged droplets carry the moisture and polluting particulates downwardly, thereby removing the particulates and the moisture from the air.

Depending on the composition of the smog (or fog), it may be preferable to mix non-toxic nucleating additives into the charged spray to promote smog remediation/fog dissipation. These additives—either alone or in combination with other nucleating materials/chemicals may be effective in treating fog or smog. A mixture of the commercial product SNOMAX (which comprises the protein *Pseudomonas syringae*) and water is an example of an additive that may be effective for this purpose. A mixture of potassium formate and water is a further example of an effective mixture/treatment component that may also be effective. Other chemical additives that are specifically formulated to remediate a dominant particulate matter present in a selected smog layer may also be effective.

For the foregoing reasons, it is clear that the method and apparatus described herein provides an innovative cloud seeding system. The current system may be modified in multiple ways and applied in various technological applications. The disclosed method and apparatus may be modified and customized as required by a specific operation or application, and the individual components may be modified and defined, as required, to achieve the desired result.

Although the materials of construction are not described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed herein are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Similarly, if the term "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

We claim:

1. An aerial electrostatic seeding(ES) method for weather modification, the method comprising the steps of:

(a) equipping at least one aircraft with a spraying system comprising at least one sprayer, the at least one sprayer comprising:

(1) a spray nozzle that produces an atomized spray;

(2) an electrode that surrounds the spray nozzle;

(b) taking off in the at least one aircraft and locating a targeted cloud comprising or having a potential to comprise: rain, fog, smog, hail, or snow;

(c) providing a pressurized fluid to the spray nozzle so that the fluid sprays from the spray nozzle;

(d) electrically charging the electrode so that the fluid spraying from the spray nozzle has an electrical charge, and consists essentially of negatively charged pressurized fluid;

(e) spraying the electrically charged fluid so that the negatively charged pressurized fluid enters the targeted cloud, thereby causing at least one of: rain enhancement, fog dissipation, smog remediation, hail suppression, or snow enhancement.

2. The method of claim 1 wherein the negatively charged pressurized fluid has a volumetric median size diameter (VMD) in the range of 50-300 μm.

3. The method of claim 1, wherein in step (b), the targeted cloud comprises or has the potential to comprise snow, whereby the at least one aircraft flies one of above or below the targeted cloud.

4. The method of claim 3, wherein the at least one aircraft flies below the targeted cloud and the negatively charged pressurized fluid ascends up into the targeted cloud.

5. The method of claim 1, wherein in step (b), the targeted cloud comprises or has the potential to comprise snow, whereby as the negatively charged pressurized fluid enters the targeted cloud, the negatively charged pressurized fluid increases the colloidal instability within the targeted cloud, thereby increasing the likelihood of snow production.

6. The method of claim 1, wherein in step (b), the targeted cloud comprises or has the potential to comprise snow, the targeted cloud comprising a cumulus or cumulonimbus cloud.

7. The method of claim 1, wherein in step (b), the targeted cloud comprises or has the potential to comprise snow, the negatively charged pressurized fluid further comprising a water freezing temperature depressant additive.

8. The method of claim 1, wherein in step (b), the targeted cloud comprises or has the potential to comprise hail, whereby the at least one aircraft flies one of above or below the targeted cloud.

9. The method of claim 1, wherein in step (b), the targeted cloud comprises or has the potential to comprise hail, whereby the at least one aircraft to sprays the negatively charged pressurized fluid in approximately all of an area under the targeted cloud.

10. The method of claim 1, wherein in step (b), the targeted cloud comprises or has the potential to comprise hail, whereby the charged spray creates a downdraft within the targeted cloud that results in rain production and thereby a disrupts a vertical circulation within the cloud that would otherwise result in production of damaging hail.

11. The method of claim 1, wherein in step (b), the targeted cloud comprises or has the potential to comprise fog or smog, the targeted cloud comprising a fog bank or a smog layer.

12. The method of claim 11, wherein the at least one aircraft flies above the fog bank or the smog layer and the negatively charged pressurized fluid descends down into the fog bank or the smog layer.

13. The method of claim 11, wherein as the charged fluid descends into the fog bank or the smog layer, droplets from the charged fluid collide with and attract moisture droplets and particulates that comprise the fog and/or smog so that the continuously enlarging droplets are carried downwardly and the fog and/or smog is dispersed.

14. The method of claim 1, wherein in step (b), the targeted cloud comprises or has the potential to comprise smog or fog, whereby the charged spray comprises one or more nucleating additives.

15. The method of claim 1, wherein the aircraft flies in a position either above, below, or through the targeted cloud either simultaneously or at regular or staggered intervals.

16. The method of claim 1, wherein the at least one aircraft comprises multiple aircraft positioned at one or more positions either above, below, or in the interior of the targeted cloud, the multiple aircraft seeding the targeted cloud either simultaneously or at regular or staggered intervals.

17. The method of claim 1 wherein the at least one aircraft comprises an unmanned air vehicle (UAV).

18. The method of claim 17 wherein the UAV is operated by a pilot either on the ground or in a separate aircraft.

19. The method of claim 17 wherein the UAV is completely autonomous and only establishes a link with a human operator in an emergency.

* * * * *